C. F. HALL.
MACHINE FOR STRIPPING TOBACCO.
APPLICATION FILED APR. 13, 1905.
948,136.
Patented Feb. 1, 1910.
14 SHEETS—SHEET 11.
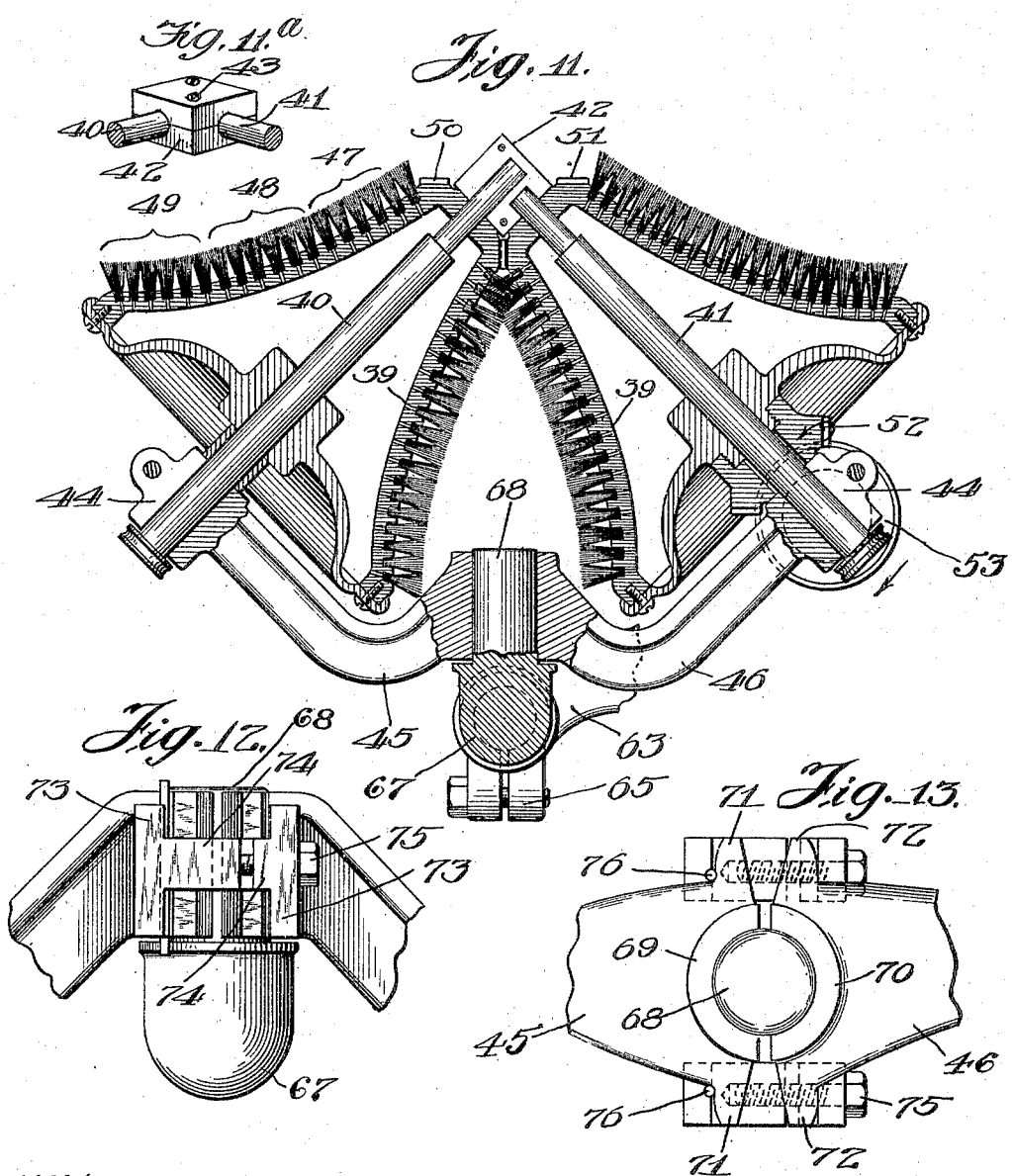

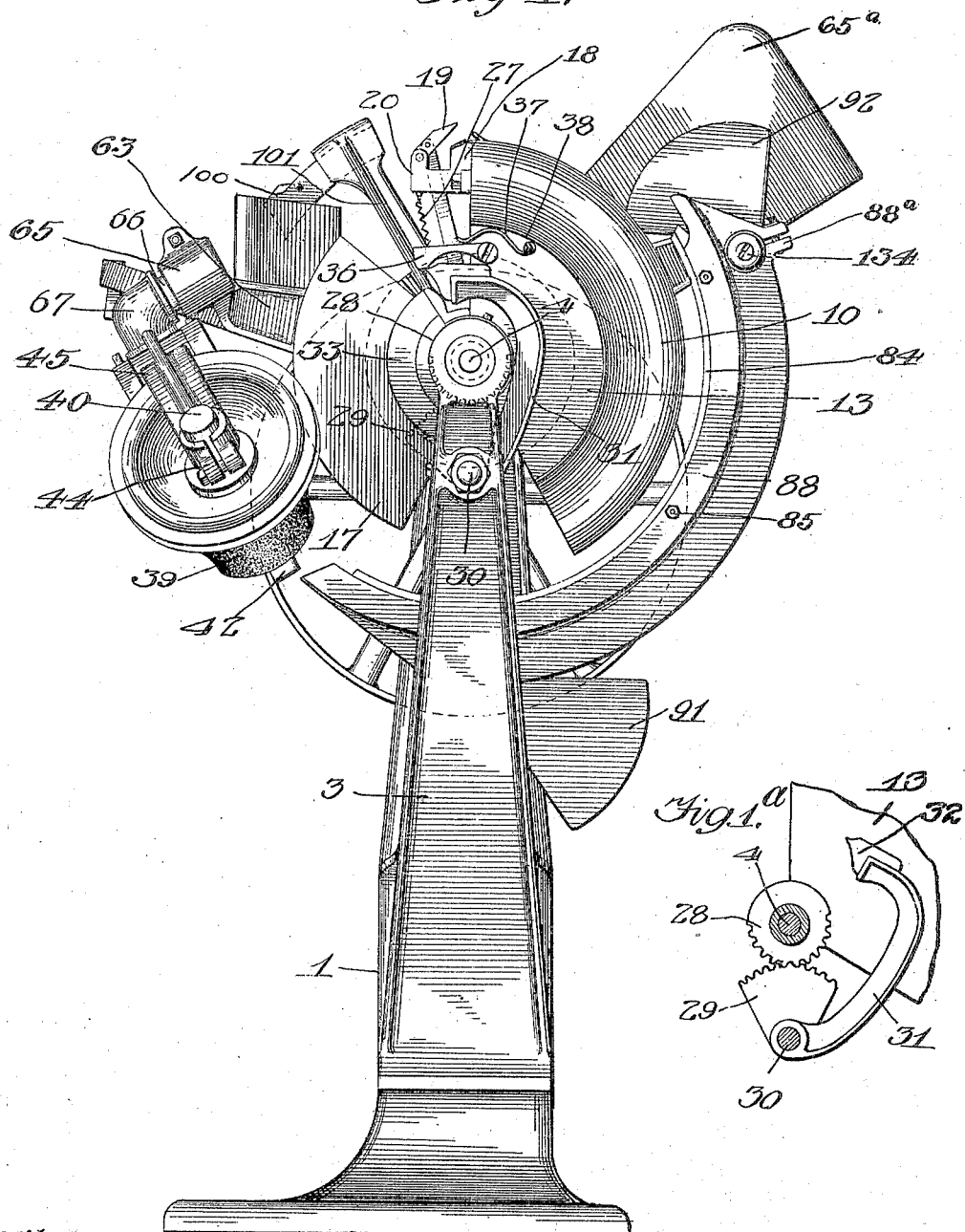

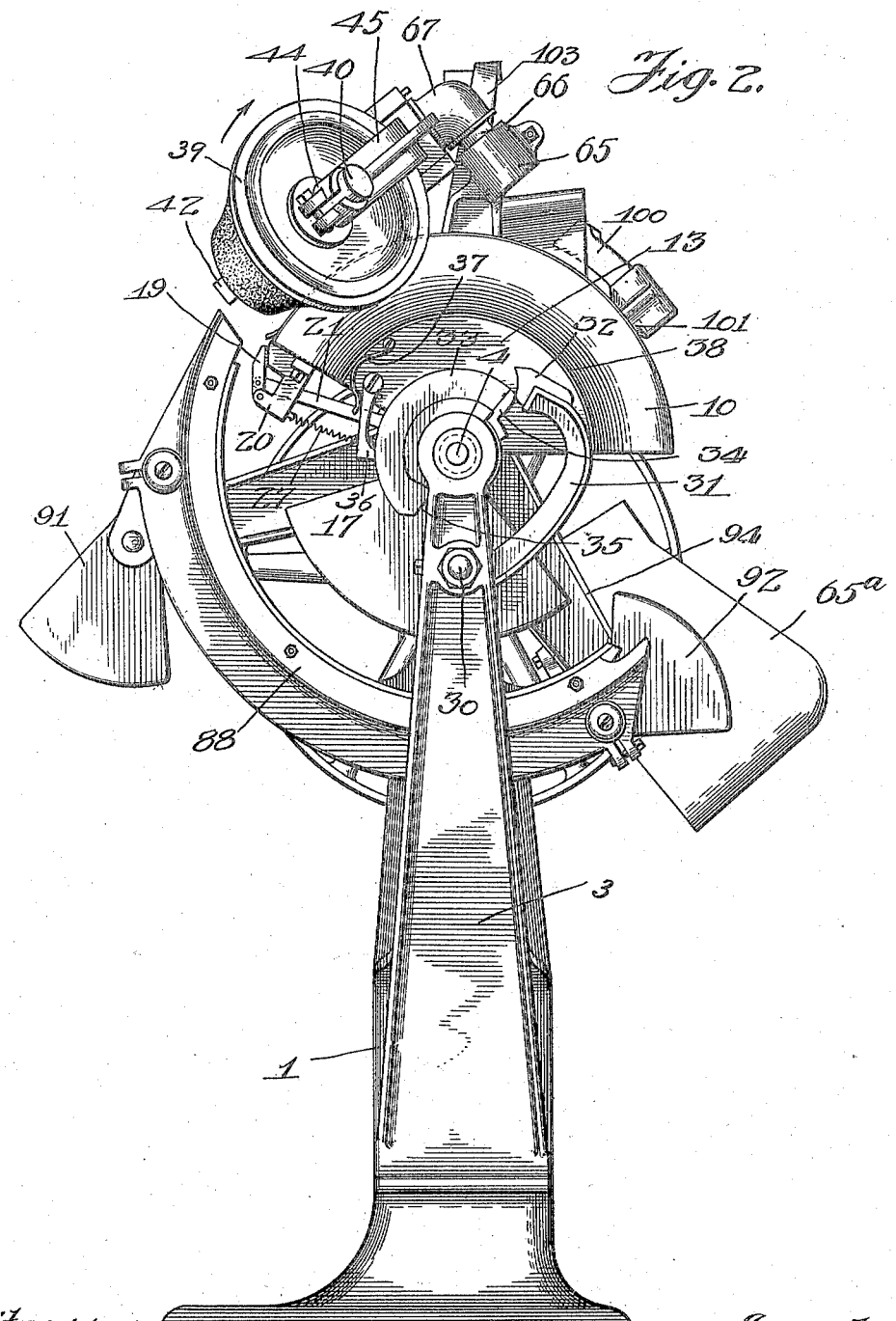

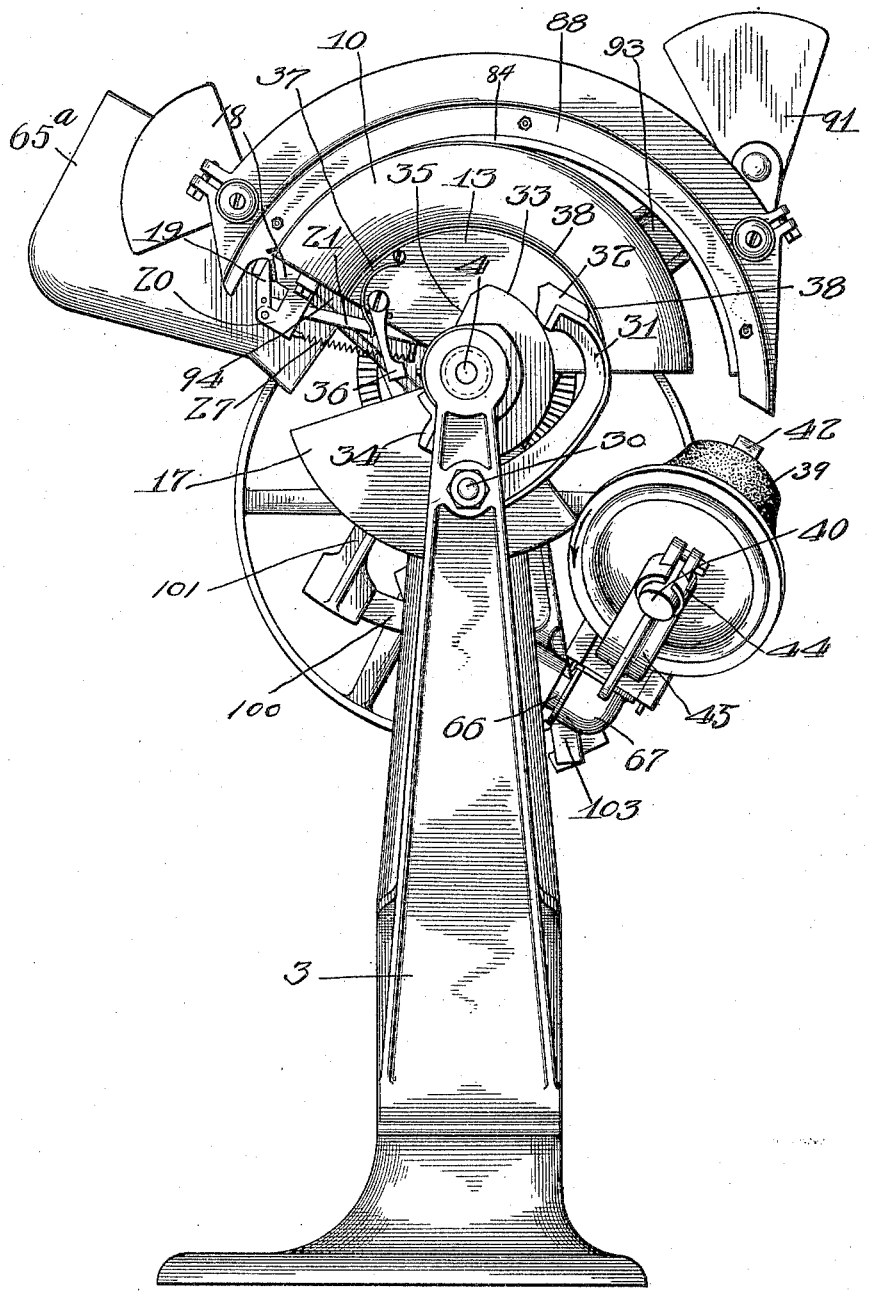

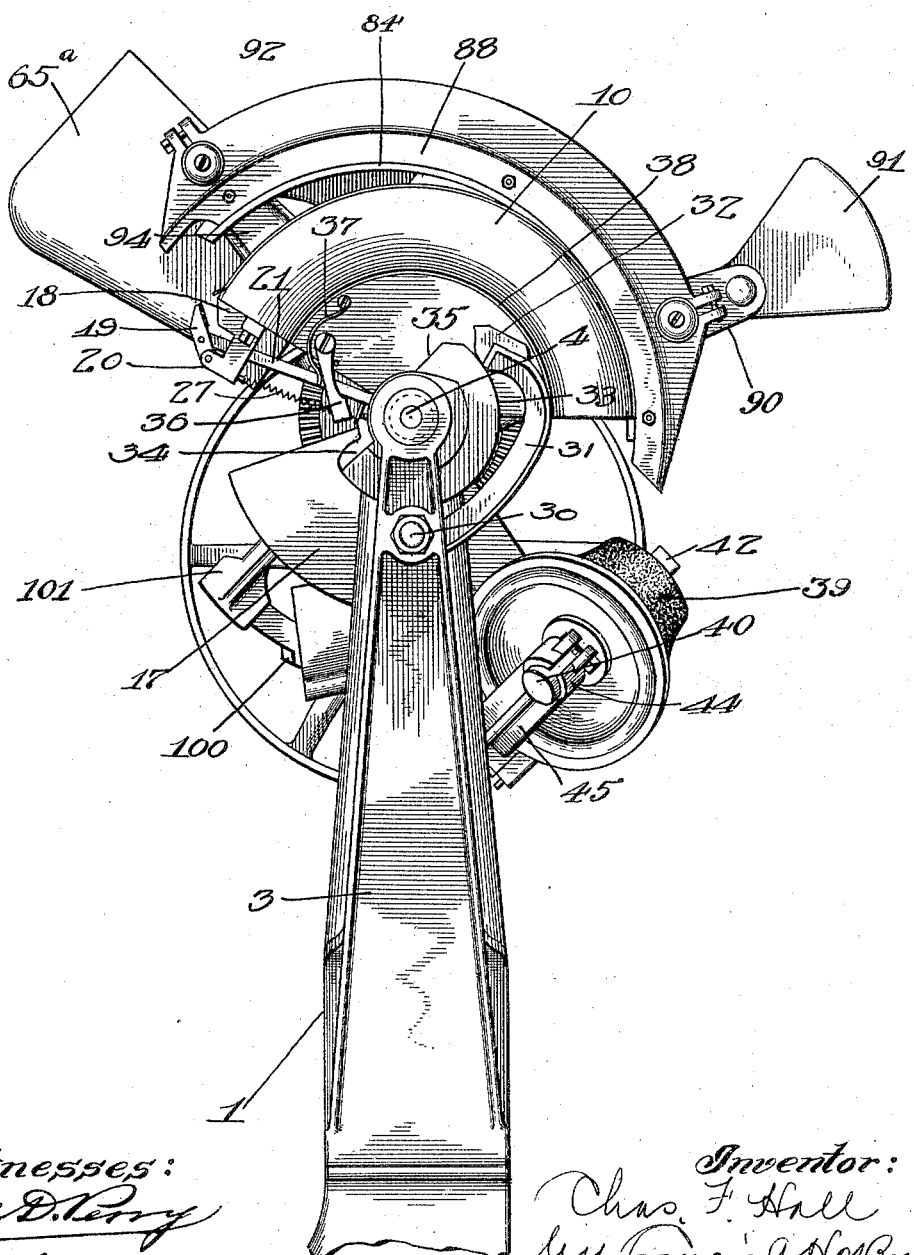

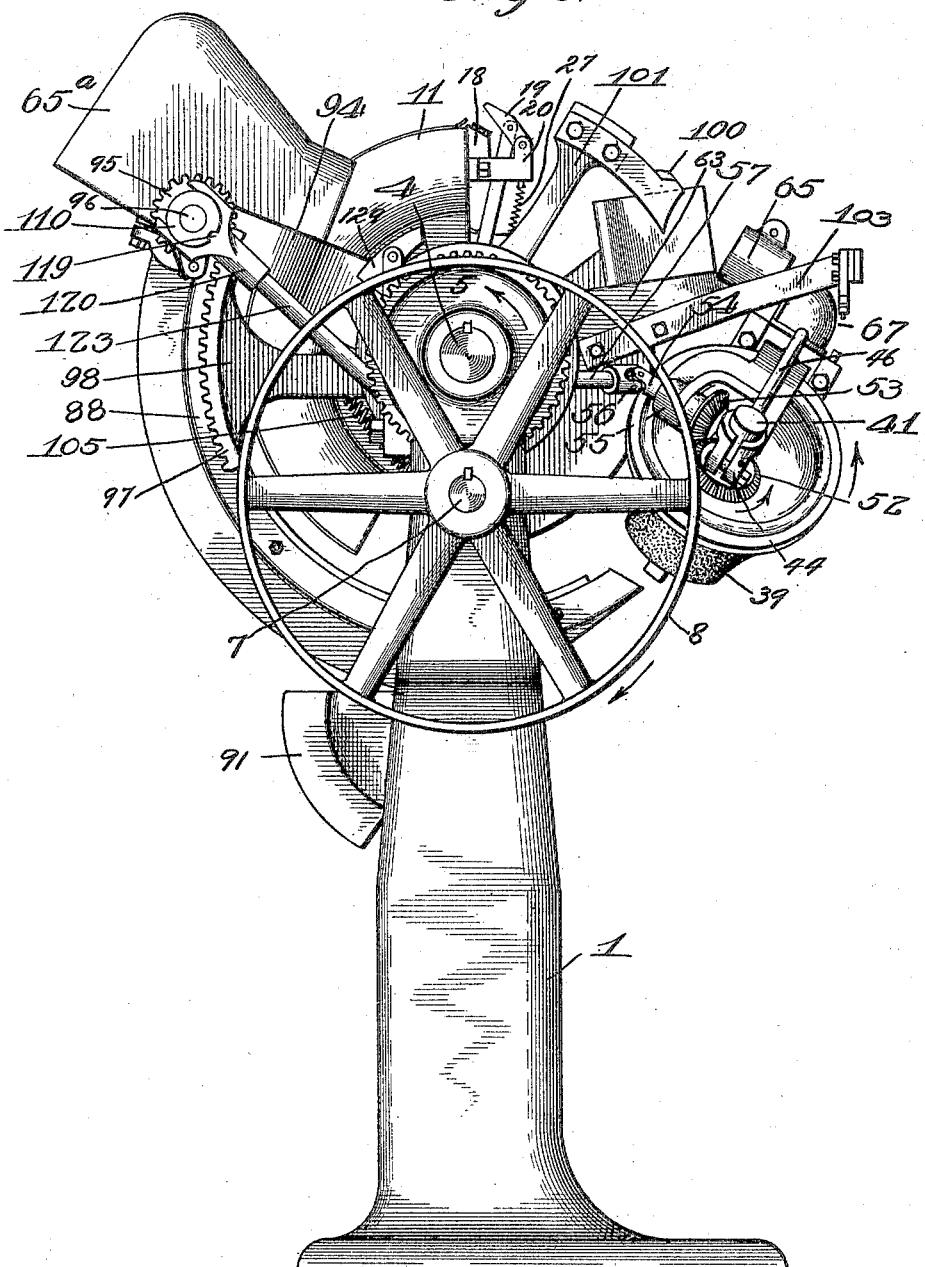

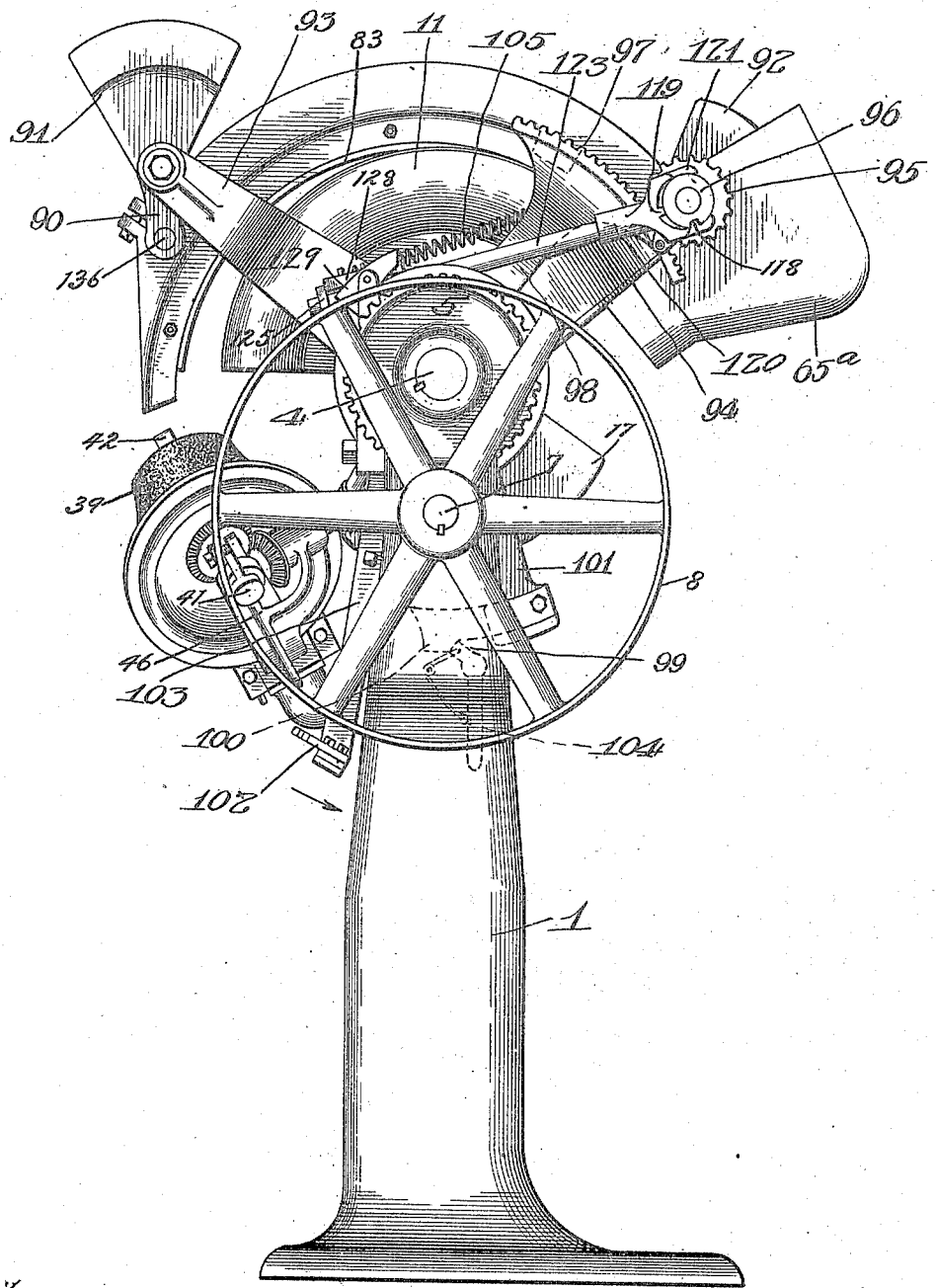

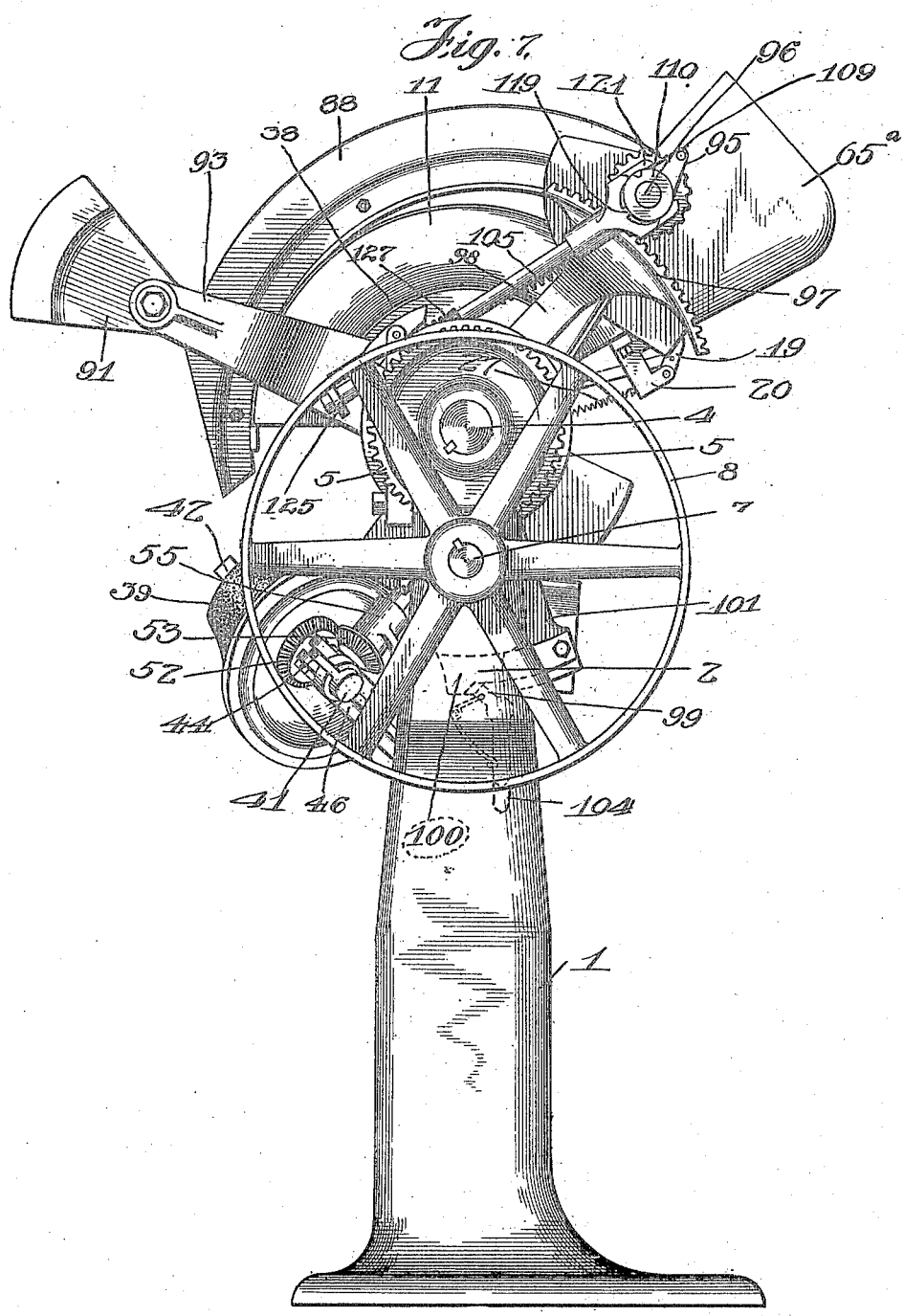

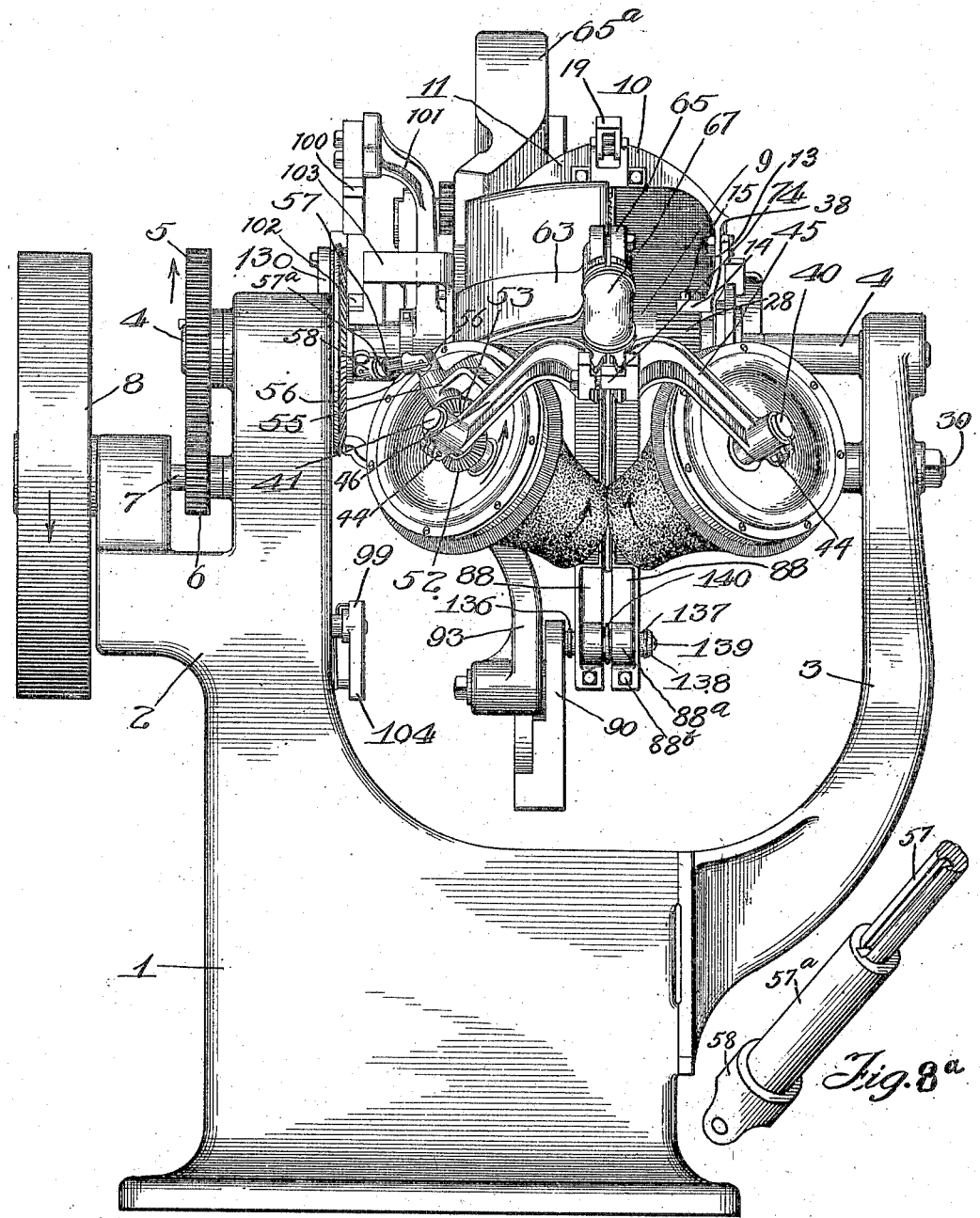

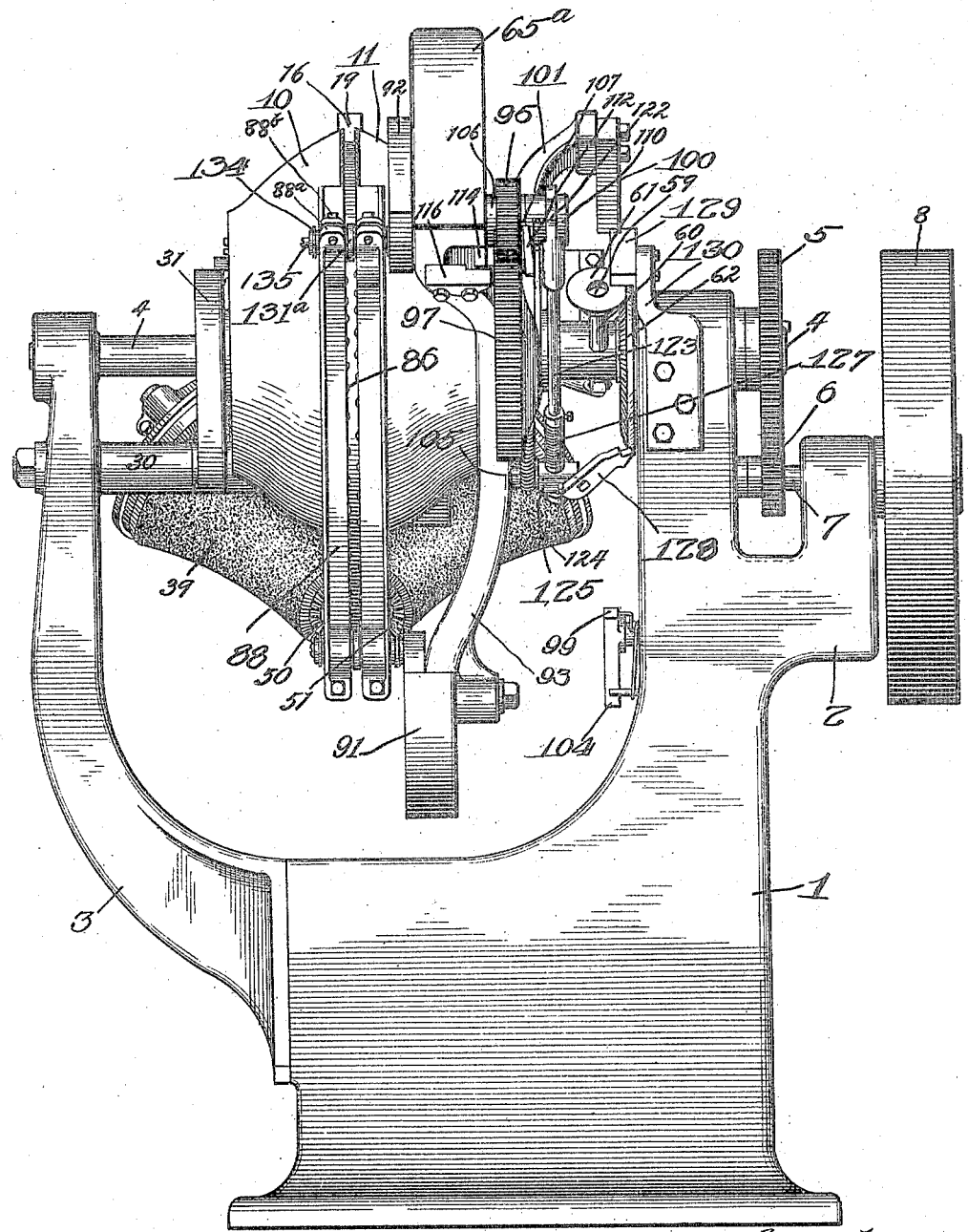

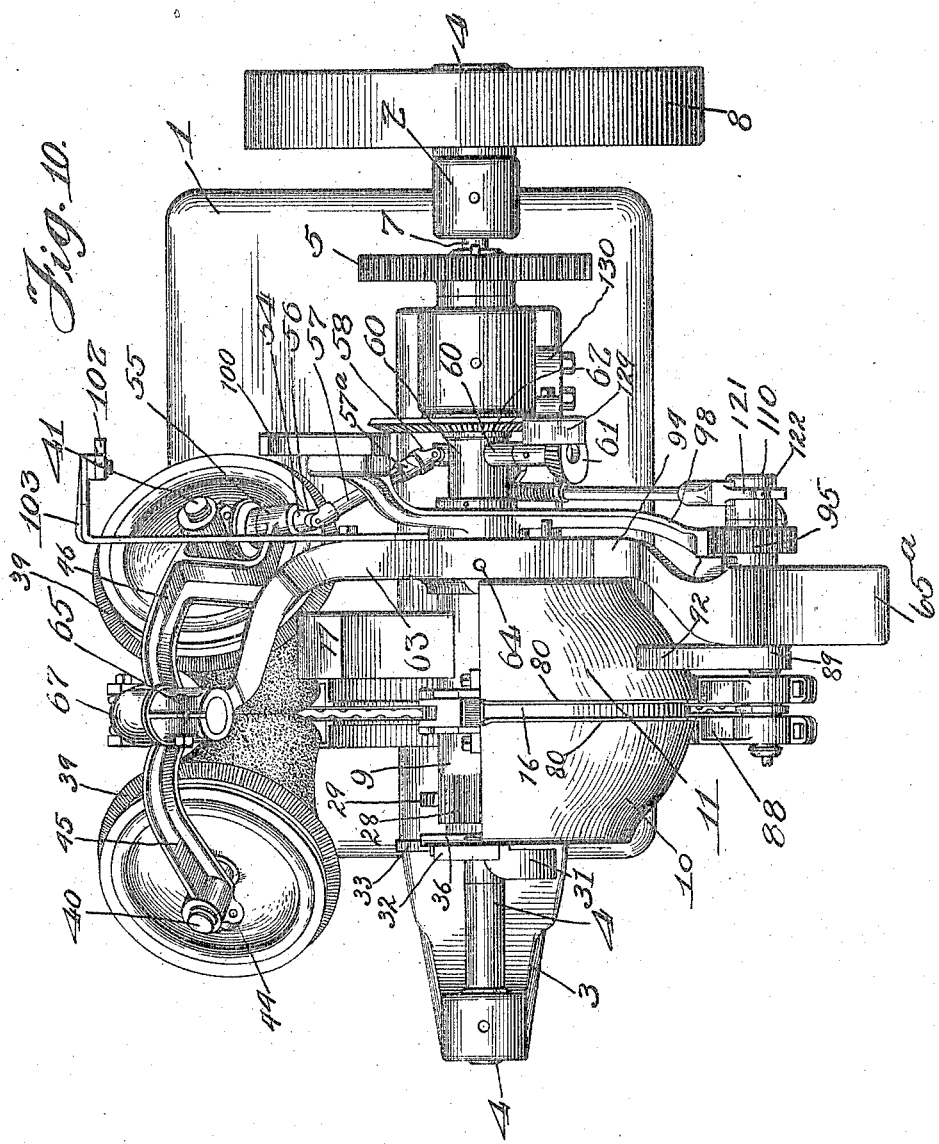

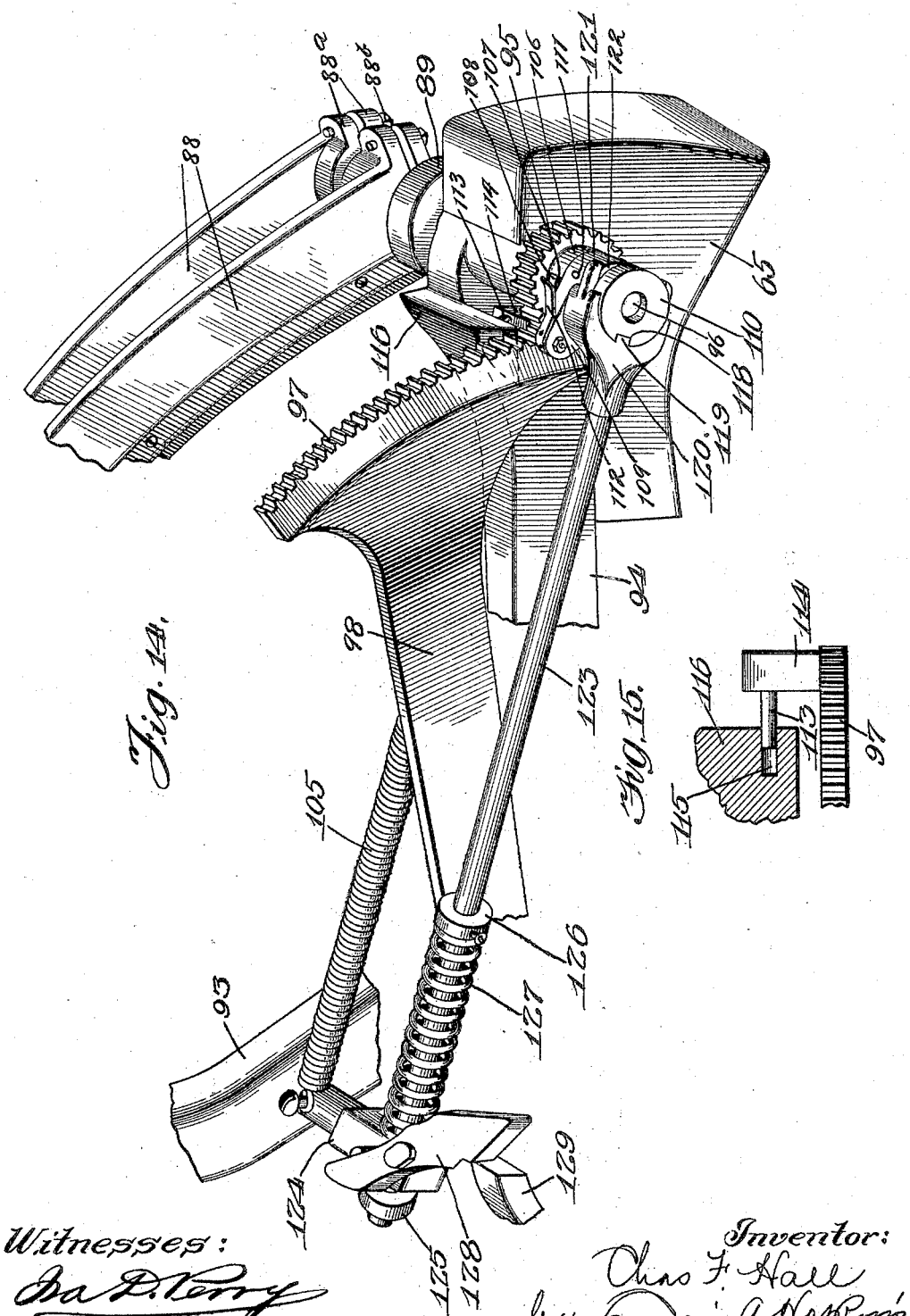

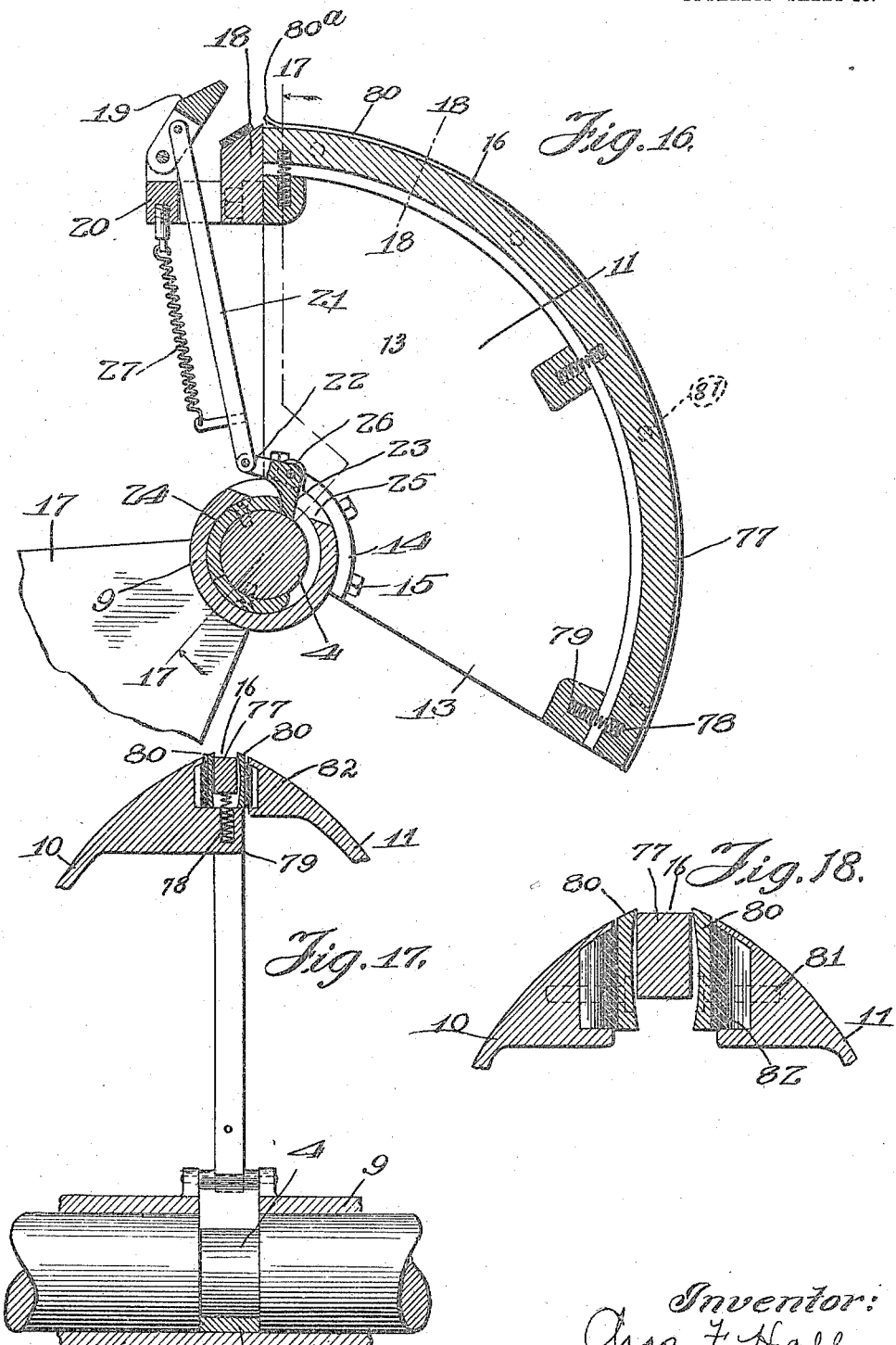

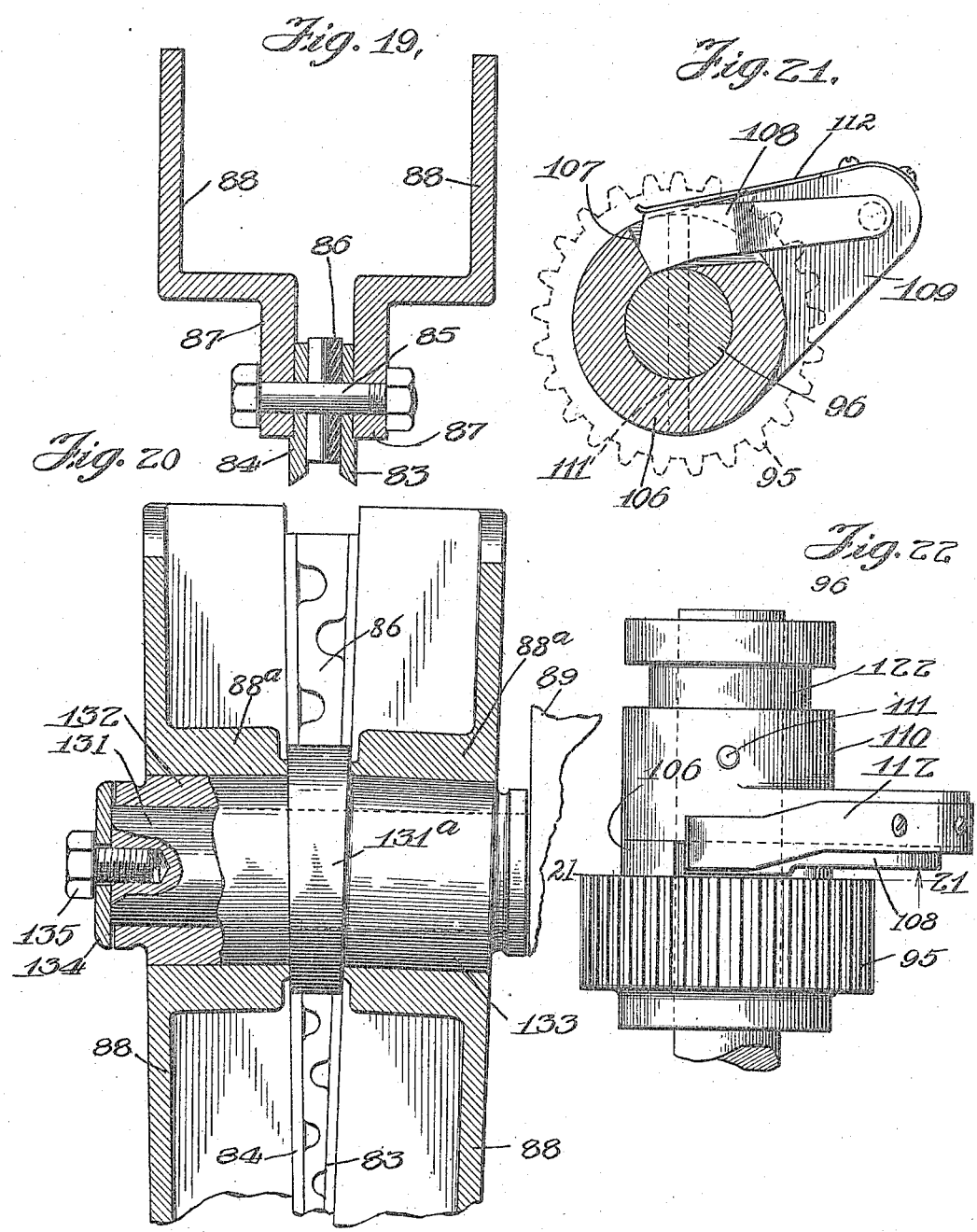

UNITED STATES PATENT OFFICE.

CHARLES F. HALL, OF CHICAGO, ILLINOIS, ASSIGNOR, BY MESNE ASSIGNMENTS, TO JOSEPH L. FRIEDMAN, OF CHICAGO, ILLINOIS.

MACHINE FOR STRIPPING TOBACCO.

948,136.     Specification of Letters Patent.     Patented Feb. 1, 1910.

Application filed April 13, 1905. Serial No. 255,404.

*To all whom it may concern:*

Be it known that I, CHARLES F. HALL, a citizen of the United States, residing at Chicago, county of Cook, and State of Illinois, have invented certain new and useful Improvements in Machines for Stripping Tobacco, of which the following is a full, clear, and exact specification.

My invention relates to the art of stripping tobacco, and it has for its primary object to provide efficient, automatic mechanism for smoothing the wrinkles out of the leaf and then severing the web of the leaf from its stem.

In my application for U. S. Letters Patent, Serial No. 215,871, filed July 9th, 1904, I have described at length the nature or character of a cured leaf of tobacco in its crude state and the difficulties to be encountered in attempting to properly strip the same by artificial means; I have also explained the general principles and theory of the method adopted by me for accomplishing that very desirable end, and as my present invention is founded upon the same general principles, being merely a refinement of my former mechanism with certain additional features for accomplishing a further step in the process, I need not repeat the same herein.

With a view to the attainment of the aforesaid object my present invention consists in the features of novelty in the construction, combination and arrangement of parts which will now be described with reference to the accompanying drawings and then more particularly pointed out in the claims.

In the said drawings—Figure 1 is a side elevation of my improved machine showing the parts in position for receiving a leaf. Fig. 1ª is a detail elevation of the mandrel releasing and returning mechanism. Fig. 2 is a similar view showing the parts in the position they assume at a later stage of the operation after the leaf has been inserted. Fig. 3 is a similar view showing the parts in a still later stage after the leaf has been entirely smoothed out and the stem cutters have been inserted to cut out the stem. Fig. 4 is a similar view showing the parts in a still further stage of the operation with the stem cutters completing their function of cutting out the stem. Fig. 5 is a side elevation of the opposite side of the machine with the parts in substantially the same position as shown in Fig. 1. Fig. 6 is a similar elevation with the parts in substantially the same position as shown in Fig. 3. Fig. 7 is a similar elevation with the parts in substantially the same position as shown in Fig. 4. Fig. 8 is a rear elevation of the machine. Fig. 8ª is a detail. Fig. 9 is a front elevation of the machine. Fig. 10 is a plan view. Fig. 11 is an enlarged, detail view of the brushes and their supporting devices showing the same partly in section. Fig. 11ª is an enlarged detail view of one of the bearings for the axles of the brushes. Fig. 12 is an enlarged, detail view of the means for adjusting the axles of the brushes with relation to each other. Fig. 13 is a plan view of the device shown in Fig. 12. Fig. 14 is an enlarged perspective view of a portion of the knives and mechanism for actuating the same. Fig. 15 is a detail view of a dash pot hereinafter described. Fig. 16 is a vertical longitudinal section of the leaf mandrel or cone showing also the gripper and its actuating mechanism. Fig. 17 is a sectional view thereof taken on the line 17, 17 Fig. 16. Fig. 18 is an enlarged cross section on the line 18, 18 Fig. 16. Fig. 19 is an enlarged, detail cross section of the outer knives. Fig. 20 is an enlarged view of one end of the outer knives showing the means whereby they may be relatively adjusted, the same being partly in section. Fig. 21 is a detail cross section on the line 21—21 of Fig. 22 of the ratchet or dog and co-operating parts for actuating the outer knives, and Fig. 22 is a plan view thereof.

All of the operating parts of the machine may be supported upon a frame comprising a main base 1 and two standards 2, 3, which latter serve for the direct support of the main shaft 4 having suitable bearings in the standards 2, 3 and serving for the support of substantially the entire mechanism which is balanced upon said shaft and revolves there around as will be presently explained. One end of the shaft 4 is provided with a gear 5 meshing with a pinion 6 on a driving shaft 7 to which may be secured a pulley 8 or other suitable driving means.

Mounted loosely upon the shaft 4 is a hollow shaft or sleeve 9 to which is secured the cone or mandrel over which the tobacco leaf is placed while the wrinkles are being smoothed therefrom. In my present invention this cone or mandrel instead of being continued entirely around the shaft or a complete circle in cross section is but a segment as better shown in Fig. 16, and consists of two halves or sections 10, 11 each having an end web 13 provided with a flange 14 secured by bolts 15 or other suitable means to the sleeve 9, see Fig. 16, or attached to and mounted upon the sleeve in any other suitable way. As shown in Fig. 18 these halves or sections 10, 11 are arranged at a slight distance apart so as to leave between them what might be called a peripheral groove or channel 16 in which is placed the stem of the leaf when the latter is laid over the cone or mandrel preparatory to having the wrinkles smoothed therefrom. The cone or mandrel is free to rotate a limited degree about the shaft 9 from about the position shown in Fig. 1 to that illustrated in Fig. 4 and back again, and in order that it may be properly counterbalanced so as to avoid any tendency toward independent or accidental rotation, the under side of the sleeve 9 is provided with a counterweight 17 of any suitable form and proportion.

Secured to the cone or mandrel at one side thereof and at the end of the stem channel or groove 16 is the fixed jaw 18 of a stem gripper, of which the movable or hinged jaw is shown at 19. This is pivoted in an arm 20 or other suitable support on the cone or mandrel, the same being shown as a part of the jaw 18, and it is connected by a link or rod 21 to one arm 22 of a bell crank lever whose other arm 23 projects inwardly against a cam 24 pinned or otherwise secured to the shaft 4, the sleeve 9 being provided with a slot 25 for the admission of the arm 23. This bell crank is pivoted to a lug or ear 26 on the sleeve 9 in such a manner that the bell crank will move bodily with the cone or mandrel and its inner arm will at one time be against the shaft 4 so as to allow a spring 27 connected at one end to the rod 21 and at the other end to the arm 20, to pull the rod 21 upwardly and open the gripper jaw 19, while at another time it is pressed outwardly by the cam 24 and pulls the jaw 19 downwardly, closing the gripper against the action of spring 27. These parts are so proportioned and arranged that when the mandrel or cone tips into the position shown in Fig. 1 or arrives at substantially that position, the cam 24 will be just about to engage with the inner arm 23 of the bell crank, causing the gripper to close upon the end of the stem which is introduced thereto butt end foremost and is laid within the stem groove 16 by hand or by any other suitable means; and as the cone or mandrel starts to return or is about to return to its former position shown in Fig. 4, the cam 24 by rotating toward the arm 23 causes the gripper 19 to close upon the stem and carry the same forward, dragging the leaf into position on the mandrel where it is held by the gripper until it has been smoothed out and the stem severed from the web as will be presently explained.

In order to produce the described oscillatory movement of the mandrel, I provide the sleeve 9 with a segmental pinion 28 which engages with a segment rack 29 journaled upon a stem 30 mounted in the arm or standard 3 and to this segment rack 29 is secured an arm 31 which projects upwardly over the shaft 4 and carries a head 32 within the range of movement of a cam mounted upon and secured to the shaft 4 and having a concentric periphery 33 and two shoulders 34, 35. To the web 13 of one of the cone sections 10, 11, the section 10 for example, is pivoted a pawl 36 which is pressed by spring 37 normally toward the cam 33 and which pawl is in the same vertical plane as said cam so that as the cam revolves toward the right, viewing the machine as in Fig. 3, the shoulder 34 engages against the end of pawl 36 and thereby rotates the cone or mandrel toward the right into the position shown in Fig. 1, where the pawl 36 is forced upwardly out of engagement with the shoulder 34 by the head 32 engaging under it, the head 32 being moved at that time in the opposite direction or toward the left by the rotation of the pinion 28 against the segment 29. As soon as the head 32 lifts the pawl out of engagement with the shoulder 34, however, said shoulder comes into engagement with the head 32 and thereby returns the head and arm 31 to their former position, shown in Fig. 2 and consequently, by rotating the segment 29 toward the right, causes the mandrel or cone to return toward the left to its former position, shown in Fig. 2. By the time the shoulder 34 has pressed the head 32 into the position shown in Fig. 2, or slightly beyond that position, the head will have been forced outwardly a sufficient distance from the center of the cam to engage with the periphery or concentric part 33 of the cam and consequently at this period the movement of the arm 31 under the influence of the cam ceases and the arm is held stationary, the movement thereof toward the left being prevented by the concentric periphery of the cam and the movement toward the right by a flange 38 on the cone section 10 which is concentric with the concentric periphery 33 and forms therewith a path or groove equal in width to the width of the head 32. By the time the opposite shoulder 35 of the cam arrives at the head 32, which action is about to occur in Fig. 4, the shoulder 34 is again in position to engage the end of the pawl 36 and force the mandrel toward the right and the arm 31 toward the left as before described.

When the parts are in the position of Fig.

1 the leaf to be stripped is laid upon the cone or mandrel lengthwise of the groove or channel 16 with the stem of the leaf resting therein and the web of the leaf at both sides of the stem resting over the upper or contiguous edges of the mandrel sections 10, 11 respectively, the butt end of the stem being held by the gripper 19 as before described, and when the mandrel arrives at or about the position shown in Fig. 2 the two sides of the web are stroked or engaged respectively by two revolving brushes which move at their point of contact with the surfaces of the mandrel sections 10, 11, in the direction of the gripper 19, and the brushes also have a bodily movement in the opposite direction to the gripper 19 or in the same direction as their direction of rotation so that the brushes eventually pass entirely away from and around the mandrel and their bodily revolution or movement will partially counteract the stroking or swinging effect of their rotary movement; thus enabling the brushes to pass rapidly over the leaf without violent action against it. The brushes, as better shown in Fig. 11, are composed of cone shaped bodies 39 secured to axles 40, 41, which are engaged preferably at approximately right angles to each other and have their contiguous ends secured or attached together by a block 42 in which they are rigidly clamped, the said block 42 being composed of two sections as shown in Fig. 11$^a$ secured together by screws 43, while their other ends are rigidly mounted in clamps 44 formed on or secured to two arms 45, 46 respectively so that the axles 40, 41 will be rigidly held while the cones 39 rotate thereon. The body portions of cones 39 are provided with bristles or equivalent means and the same are preferably of different textures or degrees of flexibility, the bristles of each brush being divided into three sections, as it were, 47, 48, 49, the sections 47 and 49 at the extremities being stiffer than the intermediate section 48 because the section 47 engages the web of the leaf contiguous to the stem where the web is less yielding and strongest and can stand the action of the stiffer bristles while the intermediate section 48 engages the intermediate part of the web where it is tender, and the bristles 49 engage the extreme edge or perimeter of the leaf or web, which is usually curled into a welt of a tough, hard character which offers considerable resistance to the action of the bristles.

The brushes are approximately the shape shown so that they will have perfect and uniform contact from end to end with the surfaces of the mandrel sections 10, 11, notwithstanding the angular rotation of the axes of the brushes to the axis of the mandrel, all as fully described in my aforesaid application. The brushes are arranged astride of the mandrel with their smaller ends together and their bristles at the smaller ends intermeshing like the teeth of gear wheels, as shown in Fig. 11, and their larger ends at or near the outer ends of the two mandrel sections 10, 11, as shown in Figs. 8 and 10, so that the brushes in rotating will stroke the wrinkles or creases in the web of the leaf in a direction approximately transverse to said wrinkles and will cause the leaf to open and spread out in a manner which might be compared to the opening of a fan, the smaller diameter of the brushes engaging the wrinkles nearest the stem at the point where the least motion is required to thus open or unfold the leaf while the larger diameter engages the leaf at the outer end of the wrinkle or near the perimeter of the leaf where the greatest motion for unfolding the leaf is required.

The cones or bodies 39 are provided at their contiguous or smaller ends with beveled gears 50, 51 intermeshing with each other whereby the rotary motion of one brush will be imparted to the other, and one of the cones 39 is provided with a beveled gear 52 at the opposite end secured thereto in any suitable way and engaging with a beveled pinion 53 on a short shaft 54 which is mounted in a bearing 55 and provided with a universal coupling 56 connecting it with a floating shaft 57 which in turn is connected by a universal coupling 58 with a shaft 59 passing through the main shaft 4 and a hub or sleeve 60 on shaft 4 and carrying a beveled pinion 61 which engages with a beveled gear 62 fixed rigidly in any suitable way to the standard 2 or other fixed part of the machine so that as the shaft 4 rotates and causes the pinion 61 to travel around the beveled gear 62, the desired rotary movement will be imparted to the beveled pinion 52 on one of the brushes and both brushes will accordingly be rotated outwardly at their lines of contact with the sections 10, 11 of the mandrel while they are also given a bodily revolution around the mandrel by their supporting means which I will now describe.

The arms 45, 46 are supported upon a main arm 63 which is secured by pin 64 or other suitable means to the shaft 4 and consequently revolves in unison therewith and carries the brushes in a circular orbit around the mandrel concentrically with the periphery of the mandrel and in order that the weight of the brushes and the arm 63 with connected parts may be at all times counterbalanced and all undue gyration avoided, one end of the arm 63 is provided with a counterweight 65$^a$.

By the employment of the various universal joints 56, 58 and their connections it will be seen that the power transmitting mechanism thus constituted is made flexible so that the brushes may be bodily adjusted with relation to each other and to the mandrel or cones 10, 11 whereby their bristles may be caused to bear against the leaf with the requisite degree of pressure without producing undue abrasion or without bearing with undue pressure at one point and insufficient pressure at another. In order to provide for these requirements the brushes have two directions of adjustment, namely a bodily adjustment as a whole and together about the surface of the mandrel, and an independent adjustment about the axis of each other. To this end the arm 63 is provided with a clamp 65 which embraces a stem 66 of an elbow 67 having a short pin or stem 68 arranged substantially at right angles to the pin 66 and secured to the arms 45, 46 so that by loosening the clamp 65 the stem 66 may be either rotated with reference to the arm 63, which would permit of centering the smaller ends of the brushes with relation to the stem groove 16, or it may be slipped longitudinally in the clamp 65 which would adjust the brushes together and bodily radial to the surface of the mandrel.

In order that the brushes may be adjusted about the axis of each other the arms 45, 46 are clamped to the pin or stem 68 by any suitable means. Such a means is shown in Figs. 12 and 13 and it consists of two socket members 69, 70 on the arms 45, 46 respectively, embracing the pin 68 and having flanges 71, 72 respectively on both sides secured together by any suitable means, such for example as two T-shaped members each having a head 73 and a stem 74, two of these T-shaped members being used for each side as shown in Figs. 12, and 13. The heads 73 rest against the flanges 71, 72 respectively while the stems 74 project toward each other through the flanges 71, 72 and are secured together by screws 75 passing through one of the heads 73 and into the stem 74 of the opposite T-shaped member so that by tightening the screws the socket members 69, 70 may be clamped rigidly against the pin 68 and by tightening one screw more than the other the arms 45, 46 may be given a relative rotary movement on the pin 68 for imparting the aforesaid adjustment of the brushes about the axis of each other. In order that these T's may be held against displacement laterally from their seats in the flanges 71, 72, taper pins or other suitable keys 76 may be driven through one of the T's on each side in such a way as to be partially embedded in the flanges 71.

After the wrinkles have been stroked out of the web of the leaf by the action of the brushes unfolding or smoothing the wrinkles on both sides of the leaf simultaneously in approximately opposite directions, the stem of the leaf is cut out along the stem groove 16 throughout the entire length of the leaf and while the mandrel 10, 11 is preferably in its upper position as shown in Figs. 3 and 4.

By reference to Fig. 18 it will be seen that a strip 77 is placed in the stem groove 16 and curved concentrically with the periphery of the mandrel as shown in Fig. 16, and under this strip is situated a number of cushions in the form of spiral springs 78 having their inner ends situated in sockets 79 on the mandrel and their outer ends in suitable sockets in the back of the strip 77 so that the strip when not otherwise restrained will occupy a position at the outer side of the groove or channel 16 and thereby hold the stem of the leaf supported against the action of the bristles, and should the stem be unusually large it will depress the strip 77 into the groove. Arranged on each side of the strip is a stationary shearing blade 80 which is secured to the contiguous sides or edges of the cone sections 10, 11 by means of pins 81 which permit the blades 80 to move laterally or lengthwise of the axis of the mandrel but not transversely thereof, and interposed between the back of each blade and the edge of the cone section is a cushion composed of rubber 82 or other suitable means, whereby the blades will be returned to their normal position close to the edge of the strip 77. Arranged above or outwardly from these stationary shearing blades 80 are a pair of movable shearing blades 83, 84, which are curved concentrically with the blades 80 and the periphery of the mandrel and are adapted to enter between the stationary blades 80 for severing the stem from the web from end to end of the leaf. These movable blades 83 and 84 engage the leaf with a shearing action, the ends adjacent to the gripper 19 entering first and the movable blades then producing a rocking or oscillating movement until their opposite ends enter between the stationary blades in the manner shown in Fig. 4, the first action being illustrated in Fig. 3.

In order that the blades 83, 84 may be compressed or moved toward each other so as to insure their admission between the stationary blades 80 and at the same time maintain proper shearing relation to the latter blades, said blades 83, 84 are mounted upon pins 85 and interposed between them is a cushion 86 which is composed of a zigzag strip of rubber or other suitable material as shown in Figs. 19, and 20, or any other means may be employed; and to insure against the possibility of the edges of blades 83, 84 catching against the edges of the stationary blades 80, the ends of the latter are curved upwardly and outwardly as shown at 80$^a$. As before described the stem of the leaf rests upon the strip 77, during the smoothing operation, which holds the same elevated with relation to the edges of the blades 80, but when the movable blades 83, 84 enter between the blades 80 the strip 77 is thereby depressed allowing the blades 83, 84 to enter and sever the stem, and when the movable blades withdraw the strip 77 acts as a follower or ejector to lift the stem out of the groove or channel 16.

The movable blades 83, 84 are mounted between two flanges 87 on two frame members 88 which are held together by the pins 85, the latter being in the form of bolts, and the frame members 88 are supported at each end by a crank, one of these cranks being shown at 89 and the other at 90, and the cranks are so set with relation to each other that when one end of the frame is at its inner position the other end will be at the extreme of its outer position but the crank 90 is longer than the crank 89 so that the crank 89 may be given a complete rotation while the crank 90 will make but a partial rotation or will simply swing back and forth. Consequently it is seen that by rotating the crank 89 the blades 83, 84 at one end will be forced into engagement with the stationary blades 80 while at the other end they will be forced away from the stationary blades by the outward swing of the crank 90 as shown in Fig. 6, and as the crank 89 swings away from the crank 90 the latter will be drawn back again to its position of close relation to the mandrel and consequently the blades 83, 84 at this end will descend into the stem channel 16 as the blades at the other end withdraw.

The weight supported by the crank 90 may be counterbalanced by a suitable counterbalance weight 91 so that the shearing frame may receive only a uniform or regular rocking motion by the action of crank 89, and the weight on the opposite end of the crank 89 may be counterbalanced by a similar weight 92 secured to the crank 89. The knives 83, 84 and their frame 88 revolve in unison with the brushes around the mandrel and to that end they are supported and carried by suitable arms 93 94 which may be formed in one with the arm 63 as branches thereof or may be otherwise rigidly secured to the shaft 4, and when they arrive at or about the position shown in Fig. 3, the smoothing operation having been completed, the crank 89 is given a complete rotation by a pinion 95 mounted upon a shaft 96 to which the crank 89 is secured, which pinion is continually in engagement with a segment rack 97 supported by an arm 98 mounted loosely upon the shaft 4 and which rack 97 at other times revolves in unison with the arm 94 and pinion 95 and consequently does not affect the pinion, but when the segment 97 arrives at the position shown in Fig. 6 or shortly before it reaches that position, the revolving movement thereof with the arm 94 is arrested by a dog or catch 99 engaging with a shoulder 100 carried by an arm 101 projecting from the hub of arm 98 as a continuation thereof. By the time the pinion 95 reaches the end of the rack 97 a trip 102 carried by another arm 103 projecting from the side of arm 63, see Fig. 10, strikes a finger or lever 104 on the lower end of the stopdog 99 and throws the dog 99 out of engagement with the shoulder 100, thereby releasing the arm 98 and segment 97 and the instant of this release the arm 98 with its segment 97 is returned to its former position relative to the arm 94, or in other words made to catch up with said arm, by means of a spring 105 connected at one end to the arm 98 and at the other end to arm 93 which is virtually a part of arm 94. This movement of the segment 97 under the influence of the spring 105, of course, necessitates the backward rotation of the pinion 95 and in order to provide for this reverse rotation of the pinion 95 without again operating the shearing blades, that is without rotating crank shaft 96, the pinion 95 is provided with a clutch or ratchet connection with its shaft whereby when rotating in one direction, the direction produced by the pinion rolling over the segment 97, it will rotate the shaft 96 and operate the shearing blades as before explained, but when rotating in the opposite direction or that which is produced by the movement of the segment under it, it will run idle on its shaft. This ratchet or clutch mechanism is best shown in Figs. 21 and 22.

The hub 106 on the pinion it will be seen is provided with a tooth or notch 107 with which engages a pawl 108 pivoted to an arm 109 on a hub 110, which is secured by a pin 111 or other suitable means to the shaft 96, the pawl 108 being pressed into engagement by a spring 112. Thus it will be seen that when the pinion 95 rotates in one direction, the shoulder or tooth 107 will engage pawl 108 and rotate shaft 96 but when it rotates in the opposite direction it will run idle on its shaft 96. The movement of the segment 97 producing this backward or idle movement of pinion 95, is limited with relation to the arm 93 by a small dash pot consisting of a plunger 113 secured to a projection 114 on the inner face of the segment 97 and adapted to enter a socket 115 formed in a boss 116 on the arm 94. (See Fig. 15.)

It is quite obvious that the bodily revolution of the shearing knives around the mandrel while being thus supported by the two cranks 89, 90 would cause the knives to oscillate or move into various positions and thus make it uncertain that they would be in the position for their proper operation when the segment 97 arrives at or about the position indicated in Fig. 6, where the knives commence to descend for shearing the stem, and it is therefore desirable that means be provided for holding the shaft 96 against accidental rotation. In order to do this the hub 110 is provided with a notch 118 adapted to receive a tooth 119 on a locking dog 120 (Fig. 14). This dog 120, in order that it may maintain its proper relation to the hub 110 and at the same time move its tooth into and out of engagement with the notch 118, is formed with a guide yoke 121 partially embracing the hub 110 and engaging in a groove 122 therein. The dog 120 is connected to a rod 123 which passes through a guide 124 projecting from the side of arm 93 and on the end of rod 123 is secured a button or shoulder 125 while between the guide 124 and a collar 126 on the rod is interposed a spring 127 which holds the tooth 119 in engagement and causes it to snap into place in the notch 118 when the two come into register. Engaging with the button or shoulder 125 is a release lever 128 which is pivoted to the guide 124 and has its outer end so arranged as to engage with a cam 129 secured to a bracket 130 on standard 2. As the arm 93 revolves, the shaft 96 being locked by the tooth 119 and the arm 98 being thereby compelled to revolve in unison with the arm 93, the release lever 128 arrives at and engages the cam 129 at or about the same time the shoulder 100 reaches and engages the stop-dog 99 and consequently the tooth 119 is withdrawn from the notch 118, releasing the shaft 96 at or about the instant the movement of the rack 97 is arrested and as a consequence the pinion is rotated by its travel over the rack until the notch 118 again registers with the tooth 119 and at that instant the release lever 128 passes from the end of the cam 129, allowing the spring 127 to shoot the tooth 119 back into its notch 118, where it remains and holds the shaft 96 against rotation until the shoulder 100 again reaches and engages the stop-dog 99 and the release lever 128 again reaches and engages the cam 129. The pinion 95, however, is free to rotate in the reverse direction as the segment 97 is pulled forwardly by the spring 105.

Inasmuch as the stem of the leaf tapers from end to end it is also desirable to taper or converge the knives or shearing blades 83, 84, the companion blades 80 being similarly tapered or converged. This angular or converging relation of the shearing blades 83, 84 is best shown in Fig. 20 and from this figure it is also apparent that the crank 89 which supports the movable shearing blades at one end is provided with a crank pin 131 passing through a sleeve which is provided with an intermediate shoulder 131$^a$ and two end portions 132, 133 arranged at an angle to each other and approximately at right angles to the frame members 88 respectively, through which the angular ends 132, 133 project. This angular relation of the ends of the sleeve is a mere expedient in the construction of the device which provides for the holes in the frame members 88 being drilled at right angles, it being easier to turn the sleeve with its end at an angle than to drill the holes at a certain angle. The shoulder 131$^a$ serves as a means for spacing the frame members 88 or limiting their inward movement. The crank pin 131 is held in place in the sleeve by a washer 134 secured on the end of the crank pin by cap screw 135. The frame members 88 are secured together at their other ends by similar means comprising a crank pin 136 secured to crank 90 and held in place in the sleeve 137, similar to the sleeve 132, 133, by washer 138 and cap screw 139, 140 being the shoulder that corresponds with shoulder 131. Each end of each of the frame members 88 is provided with a split hub 88$^a$ through which the angular ends 132, 133 of the aforesaid sleeves pass and these hubs are clamped on the sleeves by screws 88$^b$.

In the operation of this machine the brushes roll together and at their lines of contact with the mandrel they sweep toward the gripper or the butt end of the stem, see Fig. 2, and they also travel bodily or revolve over the mandrel in a direction from butt to point of the leaf while the mandrel remains at rest. The brushes are thus made to pass rapidly over the leaf without stroking or sweeping it with undue swiftness or force liable to tear it, it being understood that the stroking or sweeping movement is more or less neutralized by this bodily travel since it is evident that by a proper relative adjustment of the two speeds the sweeping or stroking action may be entirely eliminated so that the action of the brushes on the leaf will be simply that of a rolling movement or contact. In theory it is immaterial, so far as this action is concerned, whether the brushes be caused to travel bodily along the leaf as in the present invention or whether the leaf be caused to move bodily with relation to the brushes as in my said former invention, but from a mechanical point of view the present means is preferable as it gets the brushes out of the way during the feeding operation and while the knives or shearing blades are cutting out the stem.

Having thus described my invention what I claim as new therein and desire to secure by Letters Patent, is:

1. In a machine for the purpose described the combination of a member on which to support the leaf, means for smoothing the leaf on said member in a line crosswise of the stem of the leaf and tending toward the butt end thereof, and means for moving said smoothing means bodily in a direction lengthwise of the stem and away from the butt end thereof.

2. In a machine for the purpose described the combination of a member on which to support the leaf, and a rotating, smoothing member contacting therewith and movable bodily in a line opposite to the direction in which it rotates at the line of contact with the first said member.

3. In a machine for the purpose described the combination of a member on which to support the leaf, and a rotating smoothing member contacting therewith, and means for revolving said rotating member bodily around said first member.

4. In a machine for the purpose described the combination of a member on which to support the leaf, and a rotating, smoothing member contacting therewith and moving bodily in a line opposite to its direction of rotation at the line of contact with the first said member, the axis of rotation of said smoothing member being set at an oblique angle to the line of its bodily travel.

5. In a machine for the purpose described the combination of a member on which to support the leaf, and two rotating, smoothing members having their axes arranged at an angle to each other and moving bodily around the first said member and in a line opposed to the direction in which they rotate at the point of contact with the support.

6. In a machine for the purpose described the combination of a member having a rounding surface on which to support the leaf, and a rotating, smoothing member contacting therewith and movable bodily around the said first member.

7. In a machine for the purpose described the combination of a member having a convex surface on which to spread the leaf, a rotary smoothing member of varying diameter from end to end contacting therewith and complementary in outline to the outline of the first said member along their line of contact, and means for moving said smoothing member bodily over the surface of the leaf supporting member with its larger end foremost.

8. In a machine for the purpose described the combination of a member having a convex surface on which to spread the leaf, and having a stem channel, with two rotary, tapering, smoothing members having their smaller ends converging at said channel, and means for moving said tapering members bodily along said channel with their divergent ends foremost.

9. In a machine for the purpose described the combination of a bodily movable mandrel on which to support the leaf, a rotatable member for smoothing the leaf upon the mandrel movable bodily about the mandrel, and means for adjusting said smoothing member with relation to the surface of the mandrel.

10. In a machine for the purpose described the combination of a bodily movable mandrel for the leaf, two rotatable members movable bodily about the mandrel for smoothing the leaf on the mandrel and means for relatively adjusting said members.

11. In a machine for the purpose described the combination of a bodily movable leaf supporting mandrel, a rotary smoothing member movable bodily about the mandrel for smoothing the leaf on the mandrel, means for rotating the said member during its bodily movement and means for adjusting said member independently of said rotating means.

12. In a machine for the purpose described the combination of a bodily movable leaf supporting mandrel, two rotary members bodily movable about the mandrel for smoothing the leaf on the mandrel and being geared together, and means for rotating one of said members during its bodily movement.

13. In a machine for the purpose described the combination of a leaf supporting mandrel, two bodily revolving rotary members for smoothing the leaf on the mandrel geared together, and means for rotating one of said members as they revolve.

14. In a machine for the purpose described the combination of a leaf supporting mandrel, bodily revolving, rotary smoothing members adjustable with relation to said mandrel, and a flexible power transmitting means for rotating said smoothing member during its bodily revolution and its adjustment.

15. In a machine for the purpose described the combination of a leaf supporting mandrel, bodily revolving, rotary members for smoothing the leaf on said mandrel, adjustable with relation thereto, two arms on which said smoothing members are rotatably supported respectively, means for pivotally connecting said arms together, a rotary shaft on which said arms are supported, and means for rotating said smoothing members during their bodily revolution.

16. In a machine for the purpose described the combination of a leaf supporting mandrel, a revolving arm, two branch arms pivotally supported thereon, converging axles secured in said branch arms, rotary smoothing members journaled on said axles and operatively connected together, and means for rotating one of said smoothing members during their bodily revolution.

17. In a machine for the purpose described the combination of a leaf supporting mandrel, a rotary smoothing member mounted to revolve bodily therearound, a gear wheel located at the center of said bodily revolution, and an operative connection between said gear and smoothing member for rotating the latter.

18. In a machine for the purpose described the combination of a leaf supporting mandrel, a rotary smoothing member mounted to revolve bodily therearound, a gear wheel located at the center of said bodily revolution, a pinion engaging said gear and movable bodily therearound, a gear wheel for rotating said smoothing member, and a universal joint connection between the last said gear and pinion.

19. In a machine for the purpose described the combination of a leaf supporting mandrel, and a rotary smoothing member adjustable with relation thereto both bodily and on an axis at an angle to its axis of rotation.

20. In a machine for the purpose described the combination of a leaf supporting mandrel, and a rotary smoothing member adjustable with relation thereto bodily toward and from the face thereof, bodily across the face thereof, bodily in the direction of its own axis of rotation, and rotatably at an angle to said axis.

21. In a machine for the purpose described the combination of a leaf supporting mandrel, a revolving arm, two branch arms, an elbow having two stems, one of which is adjustably clamped to said arm and the other of which is adjustably and pivotally clamped to said branch arms at their contiguous ends, two rotary smoothing members mounted on the outer ends of said branch arms respectively and movable therewith around said mandrel, and means for rotating said smoothing members.

22. In a machine for the purpose described the combination of a leaf supporting mandrel, and a leaf smoothing member having a flexible smoothing surface of a graduated degree of flexibility corresponding to the different degrees of strength of the web of the leaf.

23. In a machine for the purpose described the combination of a leaf supporting mandrel and a leaf smoothing brush more flexible in the center than at the ends.

24. In a machine for the purpose described the combination of a leaf supporting mandrel, a gripper for holding the leaf on the mandrel, a leaf smoothing means engaging the leaf when on the mandrel, and means for oscillating the mandrel to and fro for bringing the gripper into position to receive the leaf.

25. In a machine for the purpose described the combination of a leaf supporting mandrel, a gripper for holding the leaf, a leaf smoothing member revoluble around said mandrel, means for holding said mandrel at rest while the smoothing member is acting, and means for oscillating the mandrel to and fro after the smoothing member passes it.

26. In a machine for the purpose described the combination of a leaf supporting mandrel, a gripper for holding the leaf, a leaf smoothing member revoluble around said mandrel, means for holding the mandrel at rest during the action of the smoothing member, means for oscillating the mandrel to and fro after the smoothing member passes, and means operatively connected with the mandrel for opening and closing said gripper.

27. In a machine for the purpose described the combination of a leaf supporting mandrel, a gripper for holding the leaf, a smoothing means for engaging the leaf on the mandrel, a rotating shouldered cam, a pawl on the mandrel arranged to be engaged by the shoulder of said cam, and means for disengaging said pawl and returning the mandrel.

28. In a machine for the purpose described the combination of a leaf supporting mandrel, a gripper for holding the leaf, a leaf smoothing means, a rotating shouldered cam, a pawl on said mandrel adapted to be engaged by the shoulder of said cam for oscillating the mandrel in one direction, a trip for engaging and releasing said pawl operatively connected with the mandrel to move in a direction opposite the direction of movement of said shoulder and adapted to be engaged by said shoulder for returning the mandrel.

29. In a machine for the purpose described the combination of a leaf supporting mandrel, a rotating shouldered cam, a pawl on the mandrel adapted to be engaged by the shoulder of said cam, a trip arm for releasing said pawl geared to the mandrel whereby the mandrel and arm will move oppositely and said arm being arranged to be engaged by the shoulder of said cam for returning the mandrel.

30. In a machine for the purpose described the combination of a leaf supporting mandrel having a curved flange, a rotary cam having a portion concentric with said flange, and provided with a shoulder, a pawl on said mandrel arranged to be engaged by said shoulder, a trip operatively connected with the mandrel and arranged to fit between said cam and flange and to be engaged by said pawl and shoulder successively.

31. In a machine for the purpose described the combination of a leaf smoothing member, an oscillating leaf mandrel, a gripper jaw carried by the mandrel, a cam, and an operative connection between said cam and jaw for opening and closing the jaw as the mandrel oscillates.

32. In a machine for the purpose described the combination of a leaf smoothing member, an oscillating leaf mandrel, a gripper jaw pivoted to the mandrel, a cam arranged at the center of oscillation of the mandrel, a lever pivoted to the mandrel and engaging said cam, a link connecting said lever with said jaw for moving the jaw in one direction, and a spring connected with the jaw for moving it in the opposite direction.

33. In a machine for the purpose described the combination of a leaf smoothing member, an oscillating leaf support having a channel for the stem of the leaf, and a depressible filling in said channel.

34. In a machine for the purpose described the combination of a leaf smoothing member, an oscillating leaf support having a channel for the stem of the leaf, a filling located in said channel, and independent cushions or springs forcing said filling outwardly whereby the filling may be depressed different depths throughout its length.

35. In a machine for the purpose described the combination of a curved mandrel for the leaf, and a stem cutter curved to conform to the periphery of and coöperating with the mandrel for severing the stem from the leaf said cutter and mandrel being movable in opposite directions.

36. In a machine for the purpose described the combination of oscillating means for supporting the leaf, a pair of shearing blades embedded therein, and a pair of movable shearing blades mounted opposite and adapted to coöperate with the first said shearing blades for cutting the web of the leaf on both sides of the stem.

37. In a machine for the purpose described the combination of oscillating means for supporting the leaf, a pair of shearing blades embedded therein and having a space or channels between them for receiving the stem of the leaf, and a pair of oscillating shearing blades mounted opposite and adapted to coöperate with said first shearing blades for severing the stem from the leaf.

38. In a machine for the purpose described the combination of oscillating means for supporting the leaf having a stem channel, a pair of shearing blades mounted in said channel, means for yieldingly pressing said blades toward each other, and a second pair of shearing blades arranged opposite and adapted to enter between the first said shearing blades said second pair of blades being adapted to oscillate in a direction opposed to the path of movement of the first said means.

39. In a machine for the purpose described the combination of means for supporting the leaf having a stem channel, a pair of shearing blades mounted in said channel, a depressible filling arranged between said blades, and a second pair of shearing blades adapted to enter between the first said shearing blades.

40. In a machine for the purpose described the combination of a leaf supporting means having a stem channel, a pair of shearing blades arranged along said channel at an angle to each other, a yielding cushion between said blades and a second pair of shearing blades arranged at an angle to each other opposite and adapted to coöperate with said first blades.

41. In a machine for the purpose described the combination of a leaf supporting means having a stem channel, a pair of shearing blades arranged along said channel and having their ends turned outwardly, and a second pair of shearing blades adapted to enter between the out turned ends of the first said blades.

42. In a machine for the purpose described the combination of an oscillating leaf supporting means, a pair of blades arranged therealong, and a pair of oscillating blades adapted to enter between the first said blades and move in a direction opposed to the path of movement of the leaf support, the blades of said second pair being also movable toward and from each other.

43. In a machine for the purpose described the combination of a leaf supporting means, two shearing blades arranged lengthwise thereof and side by side, a swinging support for one end of said blades, a crank supporting the other end of said blades, means for rotating said crank, and means on said leaf support for coöperating with said blades and severing the stem from the leaf.

44. In a machine for the purpose described the combination with a leaf supporting means, a leaf smoothing means, and a stem severing means revolving successively around said leaf supporting means, of means for projecting said severing means toward and from the leaf supporting means when the severing means comes opposite the leaf support.

45. In a machine for the purpose described the combination of a movable leaf supporting mandrel, a stem severing means movable bodily over said mandrel, and means for projecting said severing means toward and from the mandrel during its travel thereover.

46. In a machine for the purpose described the combination of a leaf mandrel, a stem severing means movable bodily over the mandrel and also toward and from the same, a segment movable with said severing means during its bodily travel, a stop for arresting said segment, and a pinion engaging said segment and carried with said severing means and operatively connected with the severing means for moving the latter toward and from the mandrel.

47. In a machine for the purpose described the combination of a mandrel, a stem severing means movable bodily over the mandrel and also toward and from the same, a segment movable bodily with the severing means, a stop for arresting the segment, a pinion movable bodily with the severing means and engaging said segment and operatively connected with said severing means for moving the latter toward and from the mandrel, a trip for releasing said stop, and means for advancing said segment to cause it to regain its lost travel.

48. In a machine for the purpose described the combination of a mandrel, a stem severing means movable bodily over said mandrel and also toward and from the same, a shaft for moving the severing means toward and from the mandrel, a pinion having a pawl and ratchet connection with said shaft, a segment engaging said pinion and movable bodily therewith and with the severing means, a stop for arresting the movement of the segment independently of the pinion, a trip for releasing said stop, and a spring for advancing the segment when released.

49. In a machine for the purpose described the combination of a mandrel, stem severing shears movable bodily over the mandrel, a shaft operatively connected with said shears for moving the same toward and from the mandrel, a pinion movable bodily with the shears and having pawl and ratchet connection with the shaft, a segment movable bodily with the pinion and engaging the same, a stop for arresting the movement of said segment, means for releasing said stop from the segment, means for advancing the segment when released, more rapidly than the bodily movement of the shears, and means for locking the shaft against rotation.

50. In a machine for the purpose described the combination of a mandrel, stem severing shears movable bodily over the mandrel, a shaft operatively connected with said shears for moving the same toward and from the mandrel, a pinion having pawl and ratchet connection with the shaft and movable bodily with the shears, a segment engaging the pinion and movable bodily therewith, a stop for arresting the movement of the segment, means for releasing said stop, means for advancing the segment more rapidly than the shears when released, a locking clutch member engaging therewith, and means for releasing said clutch members when the segment is arrested by said stop.

51. In a machine for the purpose described the combination of a mandrel, stem severing shears movable bodily over the mandrel, a pinion operatively connected with said shears for moving them toward and from the mandrel, a segment movable bodily with the shears and engaging said pinion, a stop for arresting the movement of the segment, means for releasing said stop, a lock for holding the shears against movement toward and from the mandrel, a lever operatively connected with said lock for releasing the same when oscillated, and said lever being movable bodily with said shears, and a cam fixed relation to said lever and adapted to engage the same when said stop is released from the segment.

52. In a machine for the purpose described the combination of a mandrel, stem severing shears movable bodily thereover, swinging supports for said shears, counterweights for said shears on said supports, and means for projecting the shears toward and from the mandrel as they move thereover.

53. In a machine for the purpose described the combination of a mandrel, stem severing shears arranged at an angle to each other for engaging the leaf upon the mandrel, two shear blade frames between which said shears are mounted, sleeves each having its ends arranged at an angle, and said angular ends passing through and supporting said shear blade frames, crank pins passing through said sleeves for supporting the same, and means for supporting said crank pins.

54. In a machine for the purpose described the combination of a member on which to support the leaf, a rotating smoothing member contiguous thereto, means for producing relative bodily movement between the leaf supporting means and the smoothing member in opposite directions and means for rotating the smoothing member during its bodily movement.

55. In a machine for the purpose described the combination of a member curved in cross section and of varying length of diameter from end to end, and a rotary brush complementary in form to the longitudinal outline of said member and arranged contiguous to the periphery thereof and movable bodily thereover.

56. In a machine for the purpose described the combination of a member on which to support the leaf, a rotating, smoothing member contiguous thereto, and means for producing relative bodily movement between the leaf supporting means and the smoothing member in opposite directions, the axis of the smoothing member being arranged at an oblique angle to the plane of its bodily movement.

57. In a machine for the purpose described the combination of a movable member having a convex surface on which to spread the leaf, a rotary smoothing member of varying diameter from end to end contacting therewith and complementary in outline to the outline of the first said member along their line of contact, and means for moving said smoothing member bodily over the surface of the leaf supporting member.

58. In a machine for the purpose described the combination of an oscillating member on which to support a leaf, a rotating smoothing member contacting therewith and means for revolving said smoothing member bodily around said first member in a direction opposed to the path of movement of the first said member when a leaf is supported upon the latter.

CHARLES F. HALL.

Witnesses:
   FRANCIS A. HOPKINS,
   A. M. UHER.